United States Patent
Muller et al.

(10) Patent No.: US 8,153,562 B2
(45) Date of Patent: *Apr. 10, 2012

(54) OLIGOGLYCEROL FATTY ACID ESTER THICKENERS FOR OIL-BASED DRILLING FLUIDS

(75) Inventors: Heinz Muller, Monheim (DE); Diana Maker, Monheim (DE); Nadja Herzog, Korschenbroich (DE)

(73) Assignee: Emery Oleochemicals GmbH, Dusseldorf (DE)

( * ) Notice: Subject to any disclaimer, the term of this patent is extended or adjusted under 35 U.S.C. 154(b) by 37 days.

This patent is subject to a terminal disclaimer.

(21) Appl. No.: 12/677,896

(22) PCT Filed: Sep. 12, 2008

(86) PCT No.: PCT/EP2008/062201
§ 371 (c)(1),
(2), (4) Date: Jun. 17, 2010

(87) PCT Pub. No.: WO2009/037213
PCT Pub. Date: Mar. 26, 2009

(65) Prior Publication Data
US 2010/0256021 A1    Oct. 7, 2010

(30) Foreign Application Priority Data
Sep. 14, 2007 (EP) ............................ 07018088

(51) Int. Cl.
*C09K 8/02* (2006.01)
*C09K 8/32* (2006.01)

(52) U.S. Cl. .......... 507/138; 507/136; 507/904; 516/53; 516/72; 516/73; 554/227

(58) Field of Classification Search .................. 507/138, 507/136, 904; 516/53, 72, 73; 554/227
See application file for complete search history.

(56) References Cited

U.S. PATENT DOCUMENTS

| | | |
|---|---|---|
| 4,374,737 A | 2/1983 | Larson et al. |
| 4,614,604 A | 9/1986 | Helfert et al. |
| 4,964,615 A | 10/1990 | Mueller et al. |
| 5,232,910 A | 8/1993 | Mueller et al. |
| 5,252,554 A | 10/1993 | Mueller et al. |
| 5,254,531 A | 10/1993 | Mueller et al. |
| 5,318,954 A | 6/1994 | Mueller et al. |
| 5,318,956 A | 6/1994 | Mueller et al. |
| 5,348,938 A | 9/1994 | Mueller et al. |
| 5,403,822 A | 4/1995 | Mueller et al. |
| 5,424,469 A | 6/1995 | Jakobson et al. |
| 5,441,927 A | 8/1995 | Mueller et al. |
| 5,461,028 A | 10/1995 | Mueller et al. |
| 5,466,719 A * | 11/1995 | Jakobson et al. ............. 514/785 |
| 5,597,934 A | 1/1997 | Klein et al. |
| 5,641,816 A | 6/1997 | Klein et al. |
| 5,663,122 A | 9/1997 | Mueller et al. |
| 5,755,892 A | 5/1998 | Herold et al. |
| 5,846,601 A | 12/1998 | Ritter et al. |
| RE36,066 E | 1/1999 | Mueller et al. |
| 5,869,434 A | 2/1999 | Mueller et al. |
| 6,022,833 A | 2/2000 | Mueller et al. |
| 6,122,860 A | 9/2000 | Von Tapavicza et al. |
| 6,165,946 A | 12/2000 | Mueller et al. |
| 6,289,989 B1 | 9/2001 | Mueller et al. |
| 6,350,788 B1 | 2/2002 | Herold et al. |
| 6,716,799 B1 | 4/2004 | Mueller et al. |
| 6,806,235 B1 | 10/2004 | Mueller et al. |
| 7,041,738 B2 | 5/2006 | Krull et al. |
| 7,666,820 B2 | 2/2010 | Mueller et al. |
| 2003/0114315 A1 | 6/2003 | Schwartz et al. |
| 2003/0114316 A1 | 6/2003 | Patel |
| 2004/0006912 A1 | 1/2004 | Krull |
| 2004/0010965 A1 | 1/2004 | Krull |
| 2006/0162241 A1 | 7/2006 | Krull |
| 2007/0049500 A1 | 3/2007 | Mueller et al. |
| 2007/0219097 A1 | 9/2007 | Mueller et al. |
| 2007/0219098 A1 | 9/2007 | Mueller et al. |
| 2008/0234145 A1 | 9/2008 | Mueller et al. |
| 2008/0262252 A1 | 10/2008 | Krull |
| 2010/0298176 A1 * | 11/2010 | Maker et al. ................. 507/138 |

FOREIGN PATENT DOCUMENTS

| | | |
|---|---|---|
| CA | 2101757 A1 | 8/1992 |
| DE | 4018228 A1 | 12/1991 |
| DE | 4102908 A1 | 8/1992 |
| DE | 10252973 A1 | 5/2004 |
| EP | 0064697 A1 | 11/1982 |
| EP | 0324887 A2 | 7/1989 |
| EP | 0374671 A1 | 6/1990 |
| EP | 0374672 A1 | 6/1990 |
| EP | 0579159 A2 | 1/1994 |
| EP | 0765368 A1 | 4/1997 |
| WO | 93/02124 A1 | 2/1993 |
| WO | 95/34610 A1 | 12/1995 |
| WO | 03/014253 A1 | 2/2003 |

OTHER PUBLICATIONS

International Preliminary Report on Patentability mailed on Apr. 7, 2010 in PCT/EP2008/062201.
International Search Report mailed on Nov. 6, 2008 in PCT/EP2008/062201.
Maker et al., U.S. Appl. No. 12/677,845, filed Mar. 12, 2010.
Muller et al., U.S. Appl. No. 12/738,701, filed Apr. 19, 2010.
Westfechtel et al., U.S. Appl. No. 12/677,874, filed Mar. 12, 2010.

* cited by examiner

*Primary Examiner* — Timothy J Kugel
(74) *Attorney, Agent, or Firm* — Smith Moore Leatherwood LLP; Philip P. McCann

(57) ABSTRACT

Oligoglycerol esters of fatty acids, preferably of unsaturated fatty acids, can be used as thickeners in oil-based drilling mud compositions. The oligoglycerides are preferably employed in invert drilling muds, the oily phase of which contains paraffins.

10 Claims, No Drawings

OLIGOGLYCEROL FATTY ACID ESTER THICKENERS FOR OIL-BASED DRILLING FLUIDS

This application is a national stage application under 35 U.S.C. 371 of international application No. PCT/EP2008/062201 filed 12 Sep. 2008, and claims priority to European Application No. EP 07018088.0 filed 14 Sep. 2007, the disclosures of which are expressly incorporated herein by reference.

BACKGROUND

The present invention relates to additives for oil-based drilling muds such as are employed for sinking ground bores on- or offshore to drill for gas or oil deposits, and specifically for thickening such mud systems.

Borehole treatment compositions are all types of auxiliary liquids which can be employed for drilling for exploration of crude oil or natural gas reservoirs. In this context, the so-called drilling fluids and drilling slurries or drilling muds built up on these, which can be used both for land-based and for sea-based boreholes, are of particular importance. On the one hand, water-based drilling muds are known with a content of about 1 to 50% of emulsified oily phase—in addition to the other conventional auxiliary substances of such a drilling mud—which are also called O/W emulsion muds. On the other hand, oil-based mud systems in which the oil forms the flowable phase or at least a substantial proportion of the flowable phase as the continuous oily phase, are widely used in practice. The so-called invert drilling slurries which contain, on the basis of W/O emulsions, a disperse aqueous phase in the continuous oily phase are of particular importance here. The content of disperse aqueous phase is conventionally in the range of from at least about 5 to 10 wt. % up to about 50 to 60 wt. %. In addition to these W/O invert drilling slurries, however, the so-called true-oil muds are also known, the liquid phase of which is formed virtually exclusively from a continuous oily phase, and which contain at most small amounts—conventionally not more than about 5 to 10 wt. %—of dispersed aqueous phase.

The non-aqueous phase of such mud systems is formed by the so-called carrier fluid. This was originally diesel oil, which, when treated with certain additives, forms the actual drilling mud. At the end of the 1980s, however, the demand arose for environment-friendly mud systems and therefore carrier fluids. In particular, these had to have a better biodegradability than the diesel oil employed hitherto.

In addition to various liquid esters such as are described e.g. in EP 0 374 672 A1, olefinic hydrocarbons have also been investigated for their usability. Reference may be made here by way of example to EP 0 765 368 A1, which relates to the use of so-called alpha-olefins as the carrier fluid.

In practice, drilling muds for ground exploration are dispersions of a liquid and a solids phase, a considerable solids content being present in the drilling muds. These are liquid mud systems for sinking rock boreholes, with the cuttings detached being brought up. It is therefore necessary for the drilling muds to have a certain density (as a rule greater than 1.2 g/cm$^3$, preferably greater than 1.5 g/cm$^3$), in order to be able to prevent any cutting into the formation. For this purpose, solids are added to the mud for weighting. As a rule, barium sulphate is used. Such liquids as a rule show thixotropic properties under exposure to shearing forces, i.e. the viscosity of these systems, which are also called non-Newtonian fluids, decreases under the influence of increasing shear stress or shear gradient. These properties can lead to problems in practice if the liquids are to be transported or pumped and are thereby exposed to various mechanical stresses. Additives are moreover used as thickeners which increase the viscosity of the mud to facilitate removal of the cuttings.

A large number of additives for increasing the viscosity of oil-based liquids, for example in engine oils or lubricants, are known from the prior art. As a rule, polymer-based thickeners are employed for this. When such additives are employed in the field of drilling muds, however, increased requirements are imposed on these thickeners. When a drilling mud is employed in practice, its rheological properties change continuously, for example due to the nature and amount of the cuttings, or due to cutting in of liquid or gas from the rock formation surrounding the borehole. The additives must moreover be liquid in a wide temperature range, those additives which can also still be used at low temperatures of significantly below 0° C. being sought in particular. The use of these additives of course should not influence the stability of the drilling mud system. The additives should furthermore withstand very high pressures and exposure to high shearing forces and meet the biodegradability requirements increasingly imposed on such systems. In particular, the drilling muds and the additives they contain must not be toxic, this applying in particular for marine life forms, since the muds are preferably used in offshore boreholes.

SUMMARY

The present invention includes various embodiments as set forth herein.

The object of the present invention was to provide suitable thickeners for oil-based drilling muds.

The invention provides the use of oligoglycerol fatty acid esters prepared from an acid component (a) chosen from (a1) fatty acids of the general formula (I)

R—COOH            (I)

in which R represents a saturated or unsaturated, branched or linear alkyl or alkenyl radical having 7 to 21 C atoms, and/or (a2) dicarboxylic acids and/or
(a3) dimer fatty acids and/or
(a4) oligomer fatty acids and/or
(a5) hydroxy fatty acids
and
(b) oligoglycerols, or alkoxylates of oligoglycerols, as thickeners for oil-based drilling mud compositions, preferably those drilling mud compositions which contain an aqueous phase and an oily phase side by side in emulsified form.

DETAILED DESCRIPTION

The use of oligoglycerol fatty acid esters for thickening oil-based drilling mud compositions, wherein the oligoglycerol fatty acid esters are prepared from an acid component (a) chosen from (a1) fatty acids of the general formula (I)

R—COOH            (I)

in which R represents a saturated or unsaturated, branched or linear alkyl or alkenyl radical having 7 to 21 C atoms, and/or (a2) dicarboxylic acids and/or
(a3) dimer fatty acids and/or
(a4) oligomer fatty acids and/or
(a5) hydroxy fatty acids
and (b) oligoglycerols or alkoxylates of oligoglycerols is preferred.

The oligoglycerol esters for thickening oil-based drilling muds which are used according to the invention as thickeners are compounds which are known per se and can be obtained e.g. by acid- or base-catalyzed esterification directly from oligoglycerol with the particular fatty acids. EP 064 697 A1 describes various oligoglycerol esters as lubricants for PVC. The preparation of the oligoglycerol esters by means of basic catalysis from fatty acids and poly- or oligoglycerols is also described in this specification. The oligoglycerol esters (or "oligoglycerides" for short) in the context of the invention are as a rule compounds which are liquid at room temperature and are made up of a mixture of various oligoglycerol esters, it being possible for them to contain small amounts of starting substances. It is already known from DE 102 52 973 A1 to employ oligoglycerol fatty acid esters together with a selected alkylphenol resin to improve the lubricity of fuel oils. The oligoglycerol esters are also called oligoglycerol fatty acid esters or oligoglycerides.

Possible acid components (a) of the esters according to the invention are, in particular, the fatty acids of type (a1) which follow the formula (I). There may be mentioned here as preferred caproic acid, caprylic acid, 2-ethylhexanoic acid, capric acid, lauric acid, isotridecanoic acid, myristic acid, palmitic acid, palmoleic acid, stearic acid, isostearic acid, oleic acid, elaidic acid, petroselic acid, linoleic acid, linolenic acid, elaeostearic acid, arachic acid, gadoleic acid, behenic acid and erucic acid and mixtures thereof, which e.g. due to technical circumstances are obtained during high pressure cracking of natural fats and oils or during reduction of aldehydes from the Roelen oxo synthesis. Technical-grade fatty acids having 12 to 18 carbon atoms, such as, for example, coconut, palm, palm kernel or tallow fatty acids, are preferred.

Oligoglycerol esters wherein the fatty acid component (a1) is chosen from mono- or polyunsaturated, branched or linear, but preferably linear monocarboxylic acids are particularly preferred, unsaturated representatives, preferably oleic acid, also in technical-grade qualities, being particularly preferred. Those oligoglycerol esters which have linear unsaturated fatty acids as the fatty acid component are particularly preferred, preferably those which contain exclusively these fatty acid components.

Oligoglycerol esters of which component (a1) is chosen from tall oil fatty acids are likewise preferred. Tall oil fatty acids contain, in particular, mixtures of linoleic acid and conjugated $C_{18}$ fatty acids (45-65 wt. %), oleic acid (25-45 wt. %), octadeca-5,9,12-trienoic acid (5-12 wt. %) and saturated fatty acids (1-3 wt. %). In addition to the monocarboxylic acids of the type (a1), dimer fatty acids, dicarboxylic acids (a2) or oligomeric fatty acids of type (a3) or (a4) respectively are also suitable.

The dicarboxylic acids (a2) likewise represent suitable acid components. These are those carboxylic acids which contain two —COOH functions in the molecule, the saturated dicarboxylic acids being preferred in particular. The dicarboxylic acids (a2) preferably contain between 4 and 22 C atoms, in particular between 6 and 18 C atoms. There may be mentioned by way of example oxalic, malonic, succinic, glutaric, adipic, pimelic, suberic, azelaic and sebacic acid. Unsaturated dicarboxylic acids are also possible, e.g. fumaric or maleic acid. The dicarboxylic acids of group (a2) do not include the dimer fatty acids according to group (a3).

Dimer fatty acids (a3) are oxidation-stabilized dicarboxylic acids which are liquid at room temperature (21° C.) and are obtained e.g. by catalytic dimerization of unsaturated fatty acids, e.g. oleic acid, ricinene fatty acid or tall oil fatty acid, with exclusion of oxygen.

The linking gives linear, monocyclic or aromatic structures, depending on the fatty acid used. The reaction proceeds with isomerization of isolated double bonds, predominantly by an addition of the Diels-Alder type. Commercially obtainable dimerized fatty acids are worked up by distillation and are made up of a mixture which e.g. in addition to low contents of linear and branched $C_{18}$-monocarboxylic acids (monomer fatty acid) predominantly contains $C_{36}$-dicarboxylic acids and varying contents, depending on the outlay on the working up, of $C_{54}$-tricarboxylic acid (trimer fatty acid), in addition to traces of higher polymer fatty acids. Both highly pure dimeric fatty acids with a dicarboxylic acid content of >97 wt. % and hydrogenated types which are completely free from yellowing are produced industrially.

Oligomeric fatty acids (a4) are reaction products of unsaturated fatty acids with one another, it being necessary for more than 2 and not more than 5 fatty acid molecules to react with one another. These acid components are likewise a mixture of various oligomers with one another.

Mixtures of oligoglycerol esters which have been prepared in the presence of various fatty acid sources or have been obtained by mixing are preferred. Oligoglycerol esters which are also preferred are, inter alia, those which have been prepared by reaction of oligoglycerols of the formula (II) with fatty acid mixtures, preferably mixtures of saturated and unsaturated fatty acids (type (a1)) and/or dicarboxylic acids (a2) and/or dimer and/or oligomer fatty acids (type (a3) and (a4)).

Hydroxy fatty acids can furthermore be used as component (a5), ricinoleic and particularly preferably hydroxystearic acid e.g. being representatives of this class of fatty acids.

The components (b), that is to say the oligoglycerols in the context of the present teaching, contain between 2 and 10 glycerol monomers in the molecule, mixtures of various oligomers being present side by side, depending on the preparation process (e.g. the reaction temperature or time or the catalysts used). Oligoglycerol as the alcohol component in the context of the invention is commercially obtainable. Both pure and also preferably technical-grade qualities of the oligoglycerol can be employed for the preparation of the oligoglycerides to be used according to the invention. It can be prepared e.g. by condensation of glycerol, for example in the presence of basic lithium compounds, such as is described in WO 93/02124 A1. US 2003/0114316 A1 discloses invert drilling mud systems, that is to say compositions which contain an aqueous and oily phase in a form side by side in emulsified form, and indeed as a water-in-oil emulsion, wherein the oily phase is continuous and the aqueous phase is the discontinuous phase, where these invert systems must contain either fatty acid esters of di- or triglycerol or esters of polyglycerols, in each case with fatty acids of the $C_{10}$-$C_{20}$ fraction, as emulsifiers. The esters of this specification are necessarily and exclusively diesters of these $C_{10}$-$C_{20}$ fatty acids with di- or triglycerol or polyglycerols, only polyglycerol-2 diisostearate and polyglycerol-3 diisostearate being disclosed by name. According to the teaching of US 2003/0114316, these esters serve as emulsifiers for the preparation of the desired invert emulsion. However, a thickening action of such substances is not disclosed in the US specification.

The polyol component (b) of the esters according to the invention, that is to say the oligoglycerols, can preferably be described with the following general formula (II):

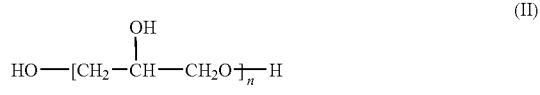

wherein n denotes a number between 2 and 10. The esters then preferably follow the general formula (III)

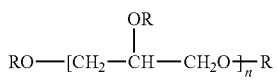
$$RO-[CH_2-CH-CH_2O]_n-R \quad (III)$$
$$\phantom{RO-[CH_2-}|\phantom{CH-CH_2O]_n-R}$$
$$\phantom{RO-[CH_2-}OR\phantom{H-CH_2O]_n-R}$$

in which n represents numbers between 2 and 10 and R represents either a hydrogen atom or a radical CO—R', wherein R' then represents a saturated or unsaturated alkyl or alkenyl radical having 7 to 21 C atoms, wherein at least one OH function of the oligoglycerol must be esterified. It may be preferable to use as the polyol component those oligoglycerols which are based on mixtures of di- and/or triglycerides. Depending on the quality of the oligoglycerols, these can contain between 20 and 45 wt. % of glycerol, between 20 and 40 wt. % of diglycerol, between 10 and 20 wt. % of triglycerol and between 1 to 10 wt. % of tetraglycerol as well as between 0.5 to 5 wt. % of pentaglycerol.

The formula (III) shown above reproduces oligoglycerol esters with the acid component (a1). If hydroxy fatty acids (a5) are employed for the esterification, the radicals R can of course also contain alkyl or alkenyl radicals which have one or more free hydroxyl functions.

In addition to the oligoglycerols, alkoxylates thereof, that is to say reaction products of oligoglycerols with ethylene oxide and/or propylene oxide, but also oligomers of alkoxylated glycerol can also be employed as the alcohol component for the esters according to the invention. The ethoxylated oligoglycerols are preferred here.

The oligoglycerol esters according to the invention themselves preferably have viscosities of from 100 to 1,300 mm$^2$/sec, and in particular from 150 to 1,200 mm$^2$/sec (in each case measured at 20° C.).

The oligoglycerides in the context of the present technical teaching are therefore preferably partial esters, wherein not all the free OH functions are esterified. However, full esters can also be present, depending on the reaction conditions of the esterification. Mixtures of the various partial esters, optionally in a mixture with full esters, are as a rule present side by side. In a preferred embodiment, tri-, tetra- and/or penta-fatty acid esters of oligoglycerol or any desired mixtures thereof are used as thickeners for the oil-based drilling muds. It is also preferable for the molar ratio of fatty acids: oligoglycerol in the esterification to be in the range of from 5:1 to 1:3, a particularly preferred range being a molar ratio of from 5:1 to 1:1, preferably 4:1 to 1:1 and in particular in the range of from 4:1 to 1.5:1.

If dimer fatty acids (a2) or the oligomeric fatty acids (a3) are employed as the fatty acid component, the range of fatty acid to oligoglycerol of from 1:1 to 1:2 is particularly preferred.

Furthermore, in a preferred embodiment, for the preparation of the oligoglycerol fatty acid esters the molar ratio of the number of carboxyl groups of the acid component to the number of hydroxyl groups of the polyol component in the esterification is in a range of from 5:1 to 1:1, preferably 4:1 to 1:1 and in particular in the range of from 4:1 to 1.5:1. If dimer fatty acids (a2) or the oligomeric fatty acid (a3) are chosen as the acid component, a molar ratio of the number of carboxyl groups of the acid component to the number of hydroxyl groups of the polyol component in a range of from 1:1 to 1:2 is particularly preferred. If mixtures of several acid components are employed, the number of carboxyl groups is the sum of the carboxyl groups of all the acid components. If mixtures of several polyol components are employed, the number of hydroxyl groups is the sum of the hydroxyl groups of all the polyol components.

The oligoglycerol esters of the invention are employed according to the invention only as thickeners in oil-based muds. The esters thus lead to an increased viscosity of the particular mud compared with a mud without the additive. In this context, this effect can occur either in an aged or in a non-aged mud, but preferably both in non-aged and in aged systems. Increased viscosity means that the viscosity of the mud with the additive is higher than that of an identical mud without the additive.

In this context, oil-based drilling muds (OBM) are understood in the following as meaning those systems which contain at least to the extent of more than 50 wt. % of an oily phase—based on the phase of the composition which is liquid at room temperature (21° C.)—preferably contain as the liquid phase a water-insoluble oil to the extent of more than 70 wt. % and in particular to the extent of more than 80 wt. % and here particularly preferably more than 90 wt. %.

The present teaching includes preferably the use of the oligoglycerides as thickeners in muds which form emulsions, either water-in-oil (W/O) or oil-in-water (O/W), the W/O systems, which are also called invert muds, being particularly preferred. The oligoglycerol esters are preferably suitable for thickening the abovementioned muds. Oil-based mud systems are those in which the oil forms the flowable phase or at least a substantial proportion of the flowable phase as the continuous oily phase. The so-called invert drilling slurries which contain, on the basis of W/O emulsions, a disperse aqueous phase in the continuous oily phase are of particular importance here. The content of disperse aqueous phase is conventionally in the range of from at least about 5 to 10 wt. % up to about 50 to 60 wt. %. In addition to these W/O invert drilling muds, however, the so-called true-oil muds are known, the liquid phase of which is formed virtually exclusively from a continuous oily phase, and which contain at most small amounts—conventionally not more than about 5 to 10 wt. %—of dispersed aqueous phase.

The oligoglycerol esters according to the above description can be used as a thickening additive in drilling mud compositions either by themselves or in a mixture with further, preferably oil-soluble components. Suitable and preferred components in this context are hydrocarbons, fatty acid esters, fatty acids, fatty alcohols, surfactants, glycerol, triglycerides or glycols or any desired mixtures of these compounds. The co-use of glycerol is very particularly preferred. Glycerol may already be contained e.g. in technical-grade oligoglycerides. In mixtures of oligoglycerides with glycerol, amounts of glycerol of from 10 to 40 wt. %, based on the mixture of oligoglycerol and glycerol, are preferred.

Surfactants are likewise suitable and preferred admixing components for the oligoglycerol esters. In this context, in principle all types of surfactants, whether anionic, nonionic, zwitter-ionic or cationic surfactants, can be used. However, the nonionic and the anionic surfactants are preferred. Typical examples of anionic surfactants are soaps, alkylbenzenesulphonates, alkanesulphonates, olefinsulphonates, alkyl ether sulphonates, glycerol ether sulphonates, methyl ester sulphonates, sulpho fatty acids, alkyl sulphates, fatty alcohol ether sulphates, glycerol ether sulphates, fatty acid ether sulphates, hydroxy-mixed ether sulphates, monoglyceride (ether) sulphates, fatty acid amide (ether) sulphates, mono- and dialkyl sulphosuccinates, mono- and dialkyl sulphosuccinamates, sulphotriglycerides, amide soaps, and ether carboxylic acids and salts thereof. The latter are particularly preferred surfactant components in the context of the present technical teaching. Typical examples of nonionic surfactants are fatty alcohol polyglycol ethers, alkylphenol polyglycol ethers, fatty acid polyglycol esters, fatty acid amide polyglycol ethers, fatty amine polyglycol ethers, alkoxylated triglycerides, mixed ethers or mixed formals, optionally partially oxidized alk(en)yl oligoglycosides or glucuronic acid derivatives, fatty acid N-alkylglucamides, polyol fatty acid esters, sugar esters, sorbitan esters, polysorbates and amine oxides. If the nonionic surfactants contain polyglycol ether chains, these can have a conventional, but preferably a narrowed distribution of homologues. The surfactants are an optional constituent in the additives. They are preferably employed in amounts of from 0.01 to 2 wt. %, in particular from 0.1 to 1.5 wt. % and preferably from 0.2 to 0.5 wt. %, in each case based on the total mud.

If the oligoglycerol esters are used as an additive together with other components, the oligoglycerol esters and the other components are preferably used together in weight ratios of from 20:1 to 1:1, preferably from 8:1 to 6:1 and in particular from 5:1 to 1:1.

In the context of the invention, the additives (where appropriate that is to say only the oligoglycerol ester by itself or mixtures of various oligoglycerol esters) are preferably employed in amounts of from 10 to 0.1 wt. %, based on the total weight of the mud. Advantageous ranges are 5 to 1 wt. %, and in particular 3 to 1.5 wt. %. The present technical teaching therefore also includes a method for thickening oil-based drilling muds, wherein oligoglycerides are added to the muds in amounts of from 0.1 to 10 wt. %. The oligoglycerol esters are particularly suitable here for thickening oil-based drilling muds.

The present invention also provides borehole treatment compositions containing a non-aqueous oily phase, weighting agents, fluid-loss additives, salts and optionally an aqueous phase, emulsifiers, viscosity-regulating additives, wetting agents, biocides, corrosion inhibitors, and/or an alkali reserve, wherein all or some of the non-aqueous phase is chosen from the group of
    a) paraffins having 5 to 22 C atoms and/or
    b) internal olefins having 12 to 30 C atoms in the molecule and/or
    c) carboxylic acid esters of the general formula R—COO—R', in which R represents a linear or branched, saturated or unsaturated alkyl radical having 15 to 25 C atoms and R' denotes a saturated, linear or branched alkyl radical having 3 to 22 C atoms
    d) mineral oils
    e) linear alpha-olefins (LAOS) having 12 to 30 C atoms
    f) carbonates
wherein the borehole treatment composition contains additives which contain oligoglycerol esters according to the above description or consist of these, in amounts of from 0.1 to 10 wt. %, preferably in amounts of from 1 to 5 wt. % and in particular in amounts of from 1 to 4 wt. %, based on the weight of the total mud.

Those drilling muds of which the density of the liquid component is 1.2 to 3.0 g/cm$^3$ and in particular 1.5 to 3.0 g/cm$^3$ may be preferred in this context. The oily phases of the systems according to the invention contain components a) to e) by themselves or components a), b), d) or e) together in a mixture with esters c) and optionally in a mixture with other suitable oily phases. Any desired mixtures of the oily phases a) to e) with one another are also possible.

The present invention also provides the use of the oligoglycerol esters described above for thickening the oil-based borehole treatment agents described above.

Component a)

According to the invention, linear or branched paraffins having 5 to 22 C atoms are employed as component a). As is known, paraffins—more correctly called alkanes—are saturated hydrocarbons which, for the linear and branched representatives, follow the general empirical formula $C_nH_{2n+1}$. The cyclic alkanes follow the general empirical formula $C_nH_{2n}$. The linear and branched paraffins are particularly preferred, whereas cyclic paraffins are less preferred. The use of branched paraffins is preferred in particular. Those paraffins which are liquid at room temperature, that is to say those having 5 to 16 C atoms per molecule, are furthermore preferred. However, it may also be preferable to employ paraffins having 17 to 22 C atoms, which have a wax-like consistency. It is preferable, however, to employ mixtures of the various paraffins, it being particularly preferable if these mixtures are still liquid at 21° C. Such mixtures can be formed e.g. from paraffins having 10 to 21 C atoms. Paraffins are particularly preferred oily phases—by themselves or as a mixture constituent with further oily phases—in drilling muds—preferably those of the invert type, in which the oligoglycerol esters according to the invention are used as thickeners.

Component b)

Internal olefins (abbreviated to JO in the following) can be employed according to the invention as component b). In this context, IOs are likewise compounds which are known per se and can be prepared by all the processes known for this to the person skilled in the art. EP 0 787 706 A1 describes e.g. a process for the synthesis of IOs by isomerization of alpha-olefins on sulphonic or persulphonic acids. It is characteristic that the IOs obtained in this way are linear and contain at least one olefinic double bond, which is not in the alpha-position of the alkyl chain. Those IOs or JO mixtures which contain IOs having 12 to 30 C atoms in the molecule, preferably having 14 to 24 C atoms and in particular having up to 20 C atoms in the molecule are preferably used according to the invention.

Component c)

Esters of the general formula R—COO—R', in which R represents a linear or branched, saturated or unsaturated alkyl radical having 15 to 25 C atoms and R' denotes a saturated, linear or branched alkyl radical having 6 to 22 C atoms, are furthermore a constituent of the oily phases according to the invention. Such esters are also known chemical compounds. The main use thereof in drilling muds is e.g. the subject matter of EP 0 374 672 A1 and EP 0 374 671 A1. The use of those esters of which the radical R represents a saturated or unsaturated alkyl radical having 15 to 25 C atoms and R' represents a saturated alkyl radical having 3 to 10 C atoms is particularly preferred. The saturated compounds are preferred in particular in this context. In the context of the teaching according to the invention, it is preferable for the oily phase to contain, in addition to the esters according to the above description, a maximum of 15 wt. % (based on the oily phase) of other esters with radicals R which represent alkyl radicals having more than 23 C atoms.

Component d)

Mineral oils are a collective term for liquid distillation products which are obtained from mineral raw materials (crude oil, brown and hard coal, wood or peat) and essentially comprise mixtures of saturated hydrocarbons. The mineral oils preferably contain only small amounts of aromatic hydrocarbons, preferably less than 3 wt. %. Mineral oils which are based on crude oil and are liquid at 21° C. are preferred. The mineral oils preferably have boiling points of from 180 to 300° C.

Component e)

Linear alpha-olefins (LAOs for short) are unbranched hydrocarbons which are unsaturated in the 1-position ("alpha C atom"). They can be based on natural substances, but in particular are also widely obtained by synthesis. LAOs based on natural substances are obtained as linear products with an even carbon number by dehydration of fatty alcohols based on natural substances. The LAOs obtained by synthesis routes—prepared by oligomerization of ethylene—often contain even carbon numbers in the chain, but processes for the preparation of uneven-numbered alpha-olefins are nowadays also known. In the context of the definition according to the invention—because of their volatility—as a rule at least 10, preferably at least 12 to 14 C atoms occur in the molecule. The upper limit of the LAOs which are flowable at room temperature is in the range of C18-20. However, this upper limit is not limiting for the utilizability of this substance class in the context of the invention. The upper limit of suitable LAO compounds for use in the context of the teaching according to the invention is thus significantly above the abovementioned limit value of C18-20 and can reach, for example, C30.

Component f)

In the context of the present application, carbonates are understood as meaning carbonic acid esters of fatty alcohols having 8 to 22 C atoms, preferably the diesters of carbonic acid. Such compounds and the use thereof as an oily phase for drilling mud compositions are described in DE 4018228 A1.

In addition to components a) to f), the oily phases can also contain other water-insoluble constituents as long as these are ecologically acceptable. Further particularly suitable mixture constituents of the oily phases according to the invention are therefore specifically:

(i) esters of $C_{1-5}$-monocarboxylic acids and 1- and/or polyfunctional alcohols, wherein radicals of 1-hydric alcohols have at least 6, preferably at least 8 C atoms and the polyhydric alcohols preferably have 2 to 6 C atoms in the molecule, (ii) mixtures of secondary esters chosen from the group of propyl carboxylate, butyl carboxylate, pentyl carboxylate, hexyl carboxylate, heptyl carboxylate, octyl carboxylate, nonyl carboxylate, decyl carboxylate, undecyl carboxylate, dodecyl carboxylate, tridecyl carboxylate, tetradecyl carboxylate, pentadecyl carboxylate, hexadecyl carboxylate, heptadecyl carboxylate, octadecyl carboxylate, nonadecyl carboxylate, eicosyl carboxylate, uneicosyl carboxylate, doeicosyl carboxylate and isomers thereof, wherein the secondary esters in each case have a carboxylate radical having 1 to 5 C atoms, water-insoluble ethers of monohydric alcohols having 6 to 24 C atoms, (iii) water-insoluble alcohols having 8 to 36 C atoms (iv) poly-alpha-olefins (PAO)

(v) mixtures of components (i) to (iv)

If they are those of the emulsion type, the drilling muds according to the invention contain emulsifiers as a further constituent. The choice of these depends decisively on the type of mud. Emulsifiers which can be used in practice for formation of W/O emulsions are, in particular, selected oleophilic fatty acid salts, for example amidoamine compounds. Examples of these are described in U.S. Pat. No. 4,374,737 and the literature cited there. The emulsifiers for formation of the drilling mud can be identical to or different from those which are optionally employed in the additives according to the invention themselves.

Possible emulsifiers are, preferably, nonionic emulsifiers which are assigned in particular to one of the following substance classes: (oligo)alkoxylates—in particular lower alkoxylates, where corresponding ethoxylates and/or propoxylates are of particular importance here—of base molecules of natural and/or synthetic origin which contain lipophilic radicals and are capable of alkoxylation. Alkoxylates of the type mentioned are known as such—i.e. with a terminal free hydroxyl group on the alkoxylate radical—to be nonionic emulsifiers, but the corresponding compounds can also be closed by end groups, for example by esterification and/or etherification. A further important class of nonionic emulsifiers for the purposes of the invention are partial esters and/or partial ethers of polyfunctional alcohols having in particular 2 to 6 C atoms and 2 to 6 OH groups and/or oligomers thereof with acids and/or alcohols containing lipophilic radicals. In this context, compounds of this type which are also suitable are those which additionally contain, bonded into their molecular structure, (oligo)alkoxy radicals and in this context in particular corresponding oligoethoxy radicals. The polyfunctional alcohols having 2 to 6 OH groups in the base molecule or the oligomers derived therefrom can be, in particular, diols and/or triols or oligomerization products thereof, where glycol and glycerol or their oligomers can be of particular importance. Known nonionic emulsifiers of the ethylene oxide/propylene oxide/butylene oxide block polymer type are also to be assigned to the field of partial ethers of polyfunctional alcohols. A further example of corresponding emulsifier components are alkyl (poly)glycosides of long-chain alcohols and the already mentioned fatty alcohols of natural and/or synthetic origin or alkylolamides, amine oxides and lecithins. The co-use of the now commercially available alkyl (poly)glycoside compounds (APG compounds) as emulsifier components in the context according to the invention may be of particular interest, inter alia, because this is an emulsifier class of particularly pronounced ecological acceptability. Without claim to completeness, from the substance classes of suitable emulsifier components listed here, the following representatives are additionally mentioned: (oligo)alkoxylates of fatty alcohols, fatty acids, fatty amines, fatty amides, fatty acid and/or fatty alcohol esters and/or ethers, alkanolamides, alkylphenols and/or reaction products thereof with formaldehyde and further reaction products of carrier molecules containing lipophilic radicals with lower alkoxides. As stated, the particular reaction products can also be closed by end groups at least in part. Examples of partial esters and/or partial ethers of polyfunctional alcohols are, in particular, the corresponding partial esters with fatty acids, for example of the type of glycerol mono- and/or diesters, glycol monoesters, corresponding partial esters of oligomerized polyfunctional alcohols, sorbitan partial esters and the like, and corresponding compounds with ether groupings.

In the context of the present teaching, it may be advantageous to dispense with the use of di-fatty acid esters of polyglycerols, in particular of polyglycerol-2 or -3 distearate or di-fatty acid esters of di- and/or triglycerol with $C_{10}$-$C_{20}$ fatty acids in invert drilling muds according to the above description.

The oily phases of the compositions according to the invention preferably have pour points below 0° C., preferably below −5° C. (measured in accordance with DIN ISO 3016: 1982-10). The Brookfield viscosity of the oily phases at 0° C. is at most 50 mPas. The borehole treatment compositions according to the invention have, if they are formed as an oil-based drilling mud of the W/O type, a plastic viscosity (PV) in the range of from 10 to 70 mPas and a yield point (YP) of from 5 to 60 lb/100 ft$^2$, in each case determined at 50° C. The kinematic viscosity of the oily phase, measured by the Ubbelohde method at 20° C., should preferably be at most 12 mm²/sec. The aqueous phase of the compositions according to the invention preferably has a pH in the range of from 7.5 to 12, preferably from 7.5 to 11 and in particular from 8 to 10.

In addition to the abovementioned constituents, the compositions according to the invention also contain additives, for example weighting agents, fluid-loss additives, further viscosity-regulating additives, wetting agents, salts, biocides, corrosion inhibitors, and/or an alkali reserve and emulsifiers. The general laws for the composition of the particular treatment liquids for which data are given by way of example in the following with the aid of corresponding drilling slurries apply here. The additives can be water-soluble, oil-soluble and/or water- or oil-dispersible.

Conventional additives can be: fluid-loss additives, soluble and/or insoluble substances which build up structural viscosity, alkali reserves, agents for inhibiting undesirable exchange of water between drilled formations—e.g. water-swellable clays and/or salt beds—and the e.g. water-based fluid, wetting agents for better absorption of the emulsified oily phase on solid surfaces, e.g. to improve the lubricating action, but also to improve the oleophilic closure of exposed rock formations or rock faces, biocides, for example to inhibit bacterial attack on O/W emulsions, and the like. The following are accordingly cited only by way of example: finely disperse additives to increase the density of the mud: Barium sulphate (barite) is widely used, but calcium carbonate (calcite) or the mixed carbonate of calcium and magnesium (dolomite) are also used.

Agents for building up the structural viscosity, which at the same time also act as fluid-loss additives: Bentonite or hydrophobized bentonite is primarily to be mentioned here. For salt-water muds, other comparable clays, in particular attapulgite and sepiolite, are of considerable importance in practice.

The co-use of organic polymer compounds of natural and/or synthetic origin can be of considerably importance in this connection. There are to be mentioned here in particular starch or chemically modified starches, cellulose derivatives, such as carboxymethylcellulose, guar gum, synthan gum or also purely synthetic water-soluble and/or water-dispersible polymer compounds, in particular of the type of high molecular weight polyacrylamide compounds with or without anionic or cationic modification. Thinners for regulating the viscosity: The so-called thinners can be organic or inorganic in nature, examples of organic thinners are tannins and/or quebracho extract. Further example of these are lignite and lignite derivatives, in particular lignol sulphonates.

EXAMPLES

Preparation of an Oligoglycerol Ester 924 g (77 wt. %) of a technical-grade oleic acid (acid number 201.2) were mixed with 276 g (23 wt. %) of oligoglycerol (OH number:1,178) (weight ratio 3.3:1) in a tank and the mixture was then heated to 240° C. under a nitrogen atmosphere. The water of reaction liberated was removed by distillation. When the acid number of the reaction mixture was less than 5, the pressure was reduced to 22 mbar. Thereafter, the mixture was allowed to cool to 90° C. 1 g (1 wt. %) of bleaching earth (Tonsil®) was then added and the mixture was then stirred for a further approx. 0.5 h. 1,080 g of a red-brown, clear liquid were obtained.

6 different glycerol esters with various oligoglycerol components were prepared in total.

| Additive no. | Fatty acid | Glycerol comp[1]. | Molar ratio |
|---|---|---|---|
| (1) | oleic acid | oligoglycerol | 4:1 |
| (2) | oleic acid | oligoglycerol | 84:15 |
| (3) | oleic acid | oligoglycerol | 2:1 |
| (4) | oleic acid | oligoglycerol | 3:1 |
| (5) | tall oil fatty acid | oligoglycerol | 4:1 |
| (6) | oleic acid | oligoglycerol | 84:15 |

[1]technical-grade mixture containing predominantly di- and triglycerol as oligoglycerols.

Use Tests

Example 1

To demonstrate the thickening action of the oligoglycerol esters, an invert drilling mud based on paraffin oil was prepared, the mud having the following composition:

| | |
|---|---|
| Paraffin oil | 262.5 ml |
| Emulsifier | 4.2 g |
| CaCl soln. (25 wt. % in water) | 87.5 ml |
| Fluid-loss additive | 3.5 g |
| Structure-forming agent | 3.5 g |
| Barium sulphate | 280.0 g |

The water-oil ratio was 80:20 vol. %. The mud weight was 14 lb/gal. 1.8 wt. % of an oligoglycerol ester either of additive (1) or of additive (2) was additionally added as a thickener. For comparison, the same amount of a commercially available glycerol fatty acid monoester (tall oil fatty acid monoglyceride, obtainable as OMC 1037 from Cognis Deutschland GmbH) was added to the mud (V). A mud without the additive ("blank") was moreover measured.

The measurements of the rheological data were always carried out in accordance with API bulletin RP 13 B-2. The muds were investigated before ageing (before hot rolling=BHR) and after ageing at 250° F. (121° C.) (after hot rolling=AHR). In this context, the following factors for conversion into the SI system apply: 1 lbf=4.448 m kg s; 1 lb in=0.015 m kg; 1 gal=3.79 l.

| | | Mud | | | | | | | |
|---|---|---|---|---|---|---|---|---|---|
| | | (1) | | (2) | | (V) | | (Blank) | |
| | | BHR | AHR | BHR | AHR | BHR | AHR | BHR | AHR |
| Electrical stability at RT | V | 269 | 414 | 313 | 871 | 305 | 286 | 417 | 332 |
| PV | cP | 14 | 15 | 13 | 11 | 13 | 13 | 13 | 12 |
| YP | lb/100 ft² | 7 | 6 | 8 | 10 | 2 | 3 | 0 | 1 |
| Gels 10"/10' | lb/100 ft² | 5/5 | 5/6 | 6/7 | 6/6 | 2/4 | 2/3 | 2/1 | 4/2 |

The yield point (YP) and gel strength (Gels) were measured after 10 seconds and 10 minutes, the muds (1) and (2) according to the invention showing an advantageous thickening compared with the mud without the additive and the mud (V) provided with the additive of the prior art.

Example 2

A further invert drilling mud based on paraffin oil was prepared, this having the following composition (oil-water ratio 70:30 vol. %, mud weight 14 lb/gal):

| | |
|---|---|
| Paraffin oil | 173.6 ml |
| Water | 78.0 ml |
| Emulsifier | 6.0 g |
| Lime | 1.5 g |
| Fluid-loss additive | 5.0 g |
| Calcium chloride | 27.2 g |
| Barium sulphate | 314.0 g |

17.5 g (3.1 wt. %) of a diglycerol ester either of additive (4), (5) or of additive (6) were additionally added as a thickener. For comparison, a mud without the additive ("blank") was measured. The measurements of the rheological data were always carried out in accordance with API bulletin RP 13 B-2. The muds were investigated before ageing (before hot rolling=BHR) and after ageing at 250° F. (121° C.) (after hot rolling=AHR).

| | | Mud | | | | | | |
|---|---|---|---|---|---|---|---|---|
| | | (4) | | (5) | | (6) | | blank |
| | | BHR | AHR | BHR | AHR | BHR | AHR | BHR | AHR |
| Electrical stability at RT | V | 290 | 290 | 280 | 200 | 330 | 270 | 490 | 390 |
| PV | cP | 27 | 29 | 23 | 21 | 26 | 25 | 20 | 20 |
| YP | lb/100 ft² | 22 | 20 | 24 | 16 | 22 | 22 | 5 | 5 |
| Gels 10"/10' | lb/100 ft² | 9/10 | 9/10 | 10/10 | 7/7 | 9/9 | 10/11 | 3/4 | 3/4 |

The yield point (YP) and gel strength (Gels) were measured after 10 seconds and 10 minutes, the muds (4) to (6) according to the invention showing an advantageous thickening compared with the mud without the additive.

Example 3

Drilling muds which had the following emulsifier-free composition were investigated to test whether the oligoglycerides of the present application have emulsifier properties:

| | |
|---|---|
| Paraffin oil based on internal olefins | 173 ml |
| Structure-forming agent | 7 g |
| Ca(OH)₂ | 2 g |
| Water | 50 g |
| CaCl₂ | 23 g |
| CaCO₃ | 35 g |
| BaSO₄ | 209 g |

In each case 8 wt. % (a) of an isostearate diglycerol ester (molar ratio of acid to diglycerol 2:1, as described in US 2003/0114316), (b) of an oligoglycerol oleic acid ester according to the invention (molar ratio of oleic acid to oligoglycerol 4:1) and (c) of an ester according to the invention of oleic acid and oligoglycerol in the molar ratio of 84:16 were added to this mud. The electrical stability and the filtrate properties (via the HTHP value) were then measured.

It was found that the emulsifier-free systems with the esters (b) and (c) according to the invention as additives have a poor electrical stability, and water was found in the determination of the filtrate values, which shows that the emulsifier properties of this substance class are to be evaluated as poor. On the other hand, the diglycerol ester (a), which is not according to the invention, had usable emulsifier but no thickener properties.

The invention claimed is:
1. Thickeners in oil-based drilling mud compositions comprising oligoglycerol fatty acid esters prepared from an acid component (a) chosen from (a1) fatty acids of the general formula (I)

$$R-COOH \quad (I)$$

in which R represents a saturated or unsaturated, branched or linear alkyl or alkenyl radical having 7 to 21 C atoms, and/or
(a2) dicarboxylic acids and/or
(a3) dimer fatty acids and/or
(a4) oligomer fatty acids and/or
(a5) hydroxy fatty acids
and (b) oligoglycerols or alkoxylates of oligoglycerols;
wherein said oil-based drilling muds are invert drilling muds; and
wherein said invert drilling muds comprise paraffins in the oily phase.
2. The thickeners in oil-based drilling mud compositions according to claim 1, characterized in that the fatty acids of the formula (I) are chosen from unsaturated linear fatty acids.
3. The thickeners in oil-based drilling mud compositions according to claim 1 characterized in that oligoglycerol fatty acid esters which have been prepared by conversion of oligoglycerols of the general formula (II)

$$HO-[CH_2-CH(OH)-CH_2O]_n-H \quad (II)$$

wherein n denotes a number between 2 and 10, with fatty acid mixtures;
wherein said fatty acid mixtures comprise mixtures of saturated and unsaturated fatty acids and/or dicarboxylic acids and/or dimeric and/or oligomeric fatty acids.
4. The thickeners in oil-based drilling mud compositions according to claim 1 characterized in that oleic acid or tall oil fatty acids or mixtures thereof are chosen as the fatty acid.

5. The thickeners in oil-based drilling mud compositions according to claim 1 characterized in that the molar ratio of fatty acids:oligoglycerol in the esterification is in the range of from about 5:1 to about 1:1.

6. The thickeners in oil-based drilling mud compositions according to claim 1 characterized in that the molar ratio of dimeric fatty acids or oligomeric fatty acids to the oligoglycerol in the esterification is in the range of from about 1:1 to about 1:2.

7. The thickeners in oil-based drilling mud compositions according to claim 1 characterized in that the tri-, tetra-, pentaesters of the oligoglycerols or mixtures of these esters are employed.

8. The thickeners in oil-based drilling mud compositions according to claim 1 characterized in that the oligoglycerol esters are employed as an additive in a mixture with surfactants, hydrocarbons, fatty alcohols, fatty acid esters, fatty acids, glycerol, triglycerides and/or glycols.

9. A method for the thickening of oil-based drilling mud compositions, characterized in that oligoglycerol esters according to the description in claim 1 are added to the drilling mud compositions in amounts of from about 0.1 to about 10 wt. %.

10. Thickeners in oil-based drilling mud compositions comprising oligoglycerol fatty acid esters prepared from an acid component (a) chosen from (a1) fatty acids of the general formula (I)

$$R\text{—}COOH \tag{I}$$

in which R represents a saturated or unsaturated, branched or linear alkyl or alkenyl radical having 7 to 21 C atoms, and/or (a2) dicarboxylic acids, and/or (a3) dimer fatty acids, and/or (a4) oligomer fatty acids, and/or (a5) hydroxy fatty acids;

and (b) oligoglycerols or alkoxylates of oligoglycerols wherein a mixture of oligoglycerides with glycerol is employed.

* * * * *